April 7, 1959 W. H. STULLER ET AL 2,880,890
AUTOMATIC BATCH MEASURING AND DISPENSING APPARATUSES
Filed April 12, 1956 2 Sheets-Sheet 1

INVENTORS
Walter H. Stuller +
Lloyd D. Burmeister,
BY Morsell + Morsell
ATTORNEYS.

April 7, 1959   W. H. STULLER ET AL   2,880,890
AUTOMATIC BATCH MEASURING AND DISPENSING APPARATUSES
Filed April 12, 1956   2 Sheets-Sheet 2
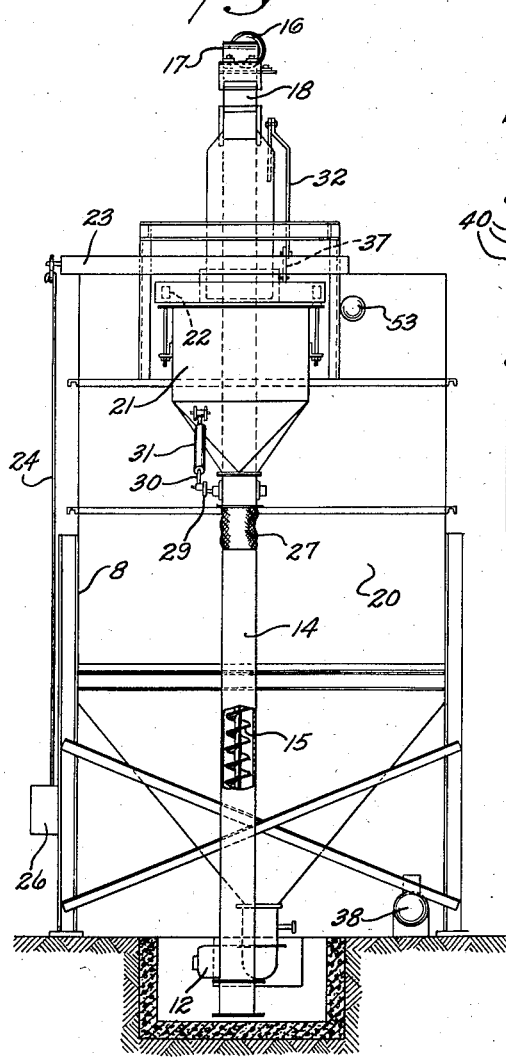
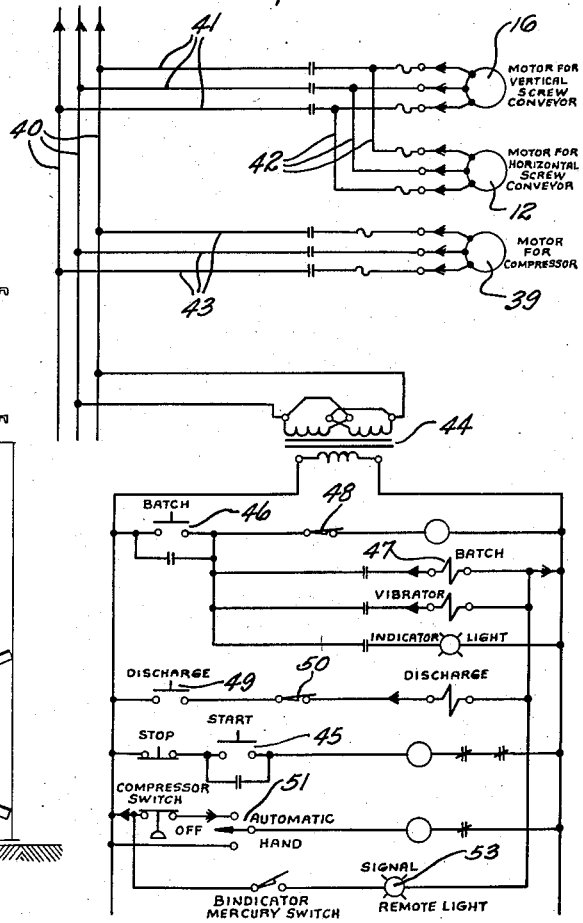
INVENTORS
Walter H. Stuller &
Lloyd G. Burmeister,
BY
Morsell & Morsell
ATTORNEYS.

United States Patent Office 2,880,890
Patented Apr. 7, 1959

2,880,890

AUTOMATIC BATCH MEASURING AND DISPENSING APPARATUSES

Walter H. Stuller, Hales Corners, and Lloyd G. Burmeister, Milwaukee, Wis., assignors, by mesne assignments, to Chain Belt Company, a corporation of Wisconsin Application April 12, 1956, Serial No. 577,706

6 Claims. (Cl. 214—2)

This invention relates to improvements in automatic batch measuring and dispensing apparatuses, for use in connection with cement and other bulk material.

Bulk material such as cement is transported to the site where the material is to be used by trucks in weighed batches. Customarily this bulk material, such as cement, is obtained from a source of supply and the desired measured batches are then transported. It is desirable that the apparatus for dispensing the bulk material in batches be susceptible of accurately weighing each batch and that it furthermore be susceptible of quickly delivering into a container or truck each measured batch, and in connection with the operation of the apparatus certain safeguards must be provided.

With the above in mind it is a primary object of the present invention to provide an automatic bulk material batch measuring and dispensing apparatus in which the bulk material is automatically moved from a source of supply to an elevated batcher which can be regulated so as to receive or accommodate a batch of material of only a predetermined weight, the batcher being dischargeable into a truck or receptacle only after the prescribed weight of material has entered the batcher, and there being means, prior to the emptying of the filled batcher, of preventing further bulk material from the supply from being fed into the batcher, the material from the supply then being diverted to a large capacity hopper or bin which is arranged to re-feed into the bulk material receiving conveyor.

A further object of the invention is to provide a bulk material batch measuring and dispensing apparatus which is portable, automatic, rapid and continuous in its operation, and which eliminates the possibility of any errors or the dispensing of underweight batches.

A further object of the invention is to provide an automatic bulk material batch measuring and dispensing apparatus in which the delivery of bulk material to the batcher is controlled by an automatically operated gate or valve arranged so that the discharge of the load from the batcher into a truck or the like cannot be accomplished unless the batcher receiving gate is closed and also arranged so that the batcher receiving gate will not open to permit the introduction of additional material into the batcher unless the batcher discharge gate or valve is closed.

A further object of the invention is to provide an automatic bulk material batch measuring and dispensing apparatus which is easily and automatically operated by means of switches or buttons on a control box, which can be set for the delivery of batches within prescribed limits, which is rapid and accurate in its operation, and which is well adapted for the purposes described.

With the above and other objects in view the invention consists of the improved automatic bulk material batch measuring and dispensing apparatus, and all of its parts and combinations as set forth in the claims, and all equivalents thereof.

In the accompanying drawings, in which the same reference characters indicate the same parts in all of the views:

Fig. 2 is an end view thereof with a portion broken away and in section; and

Fig. 3 is a wiring diagram showing the switches, electrical controls, operating motors and wires.

Figure 1:
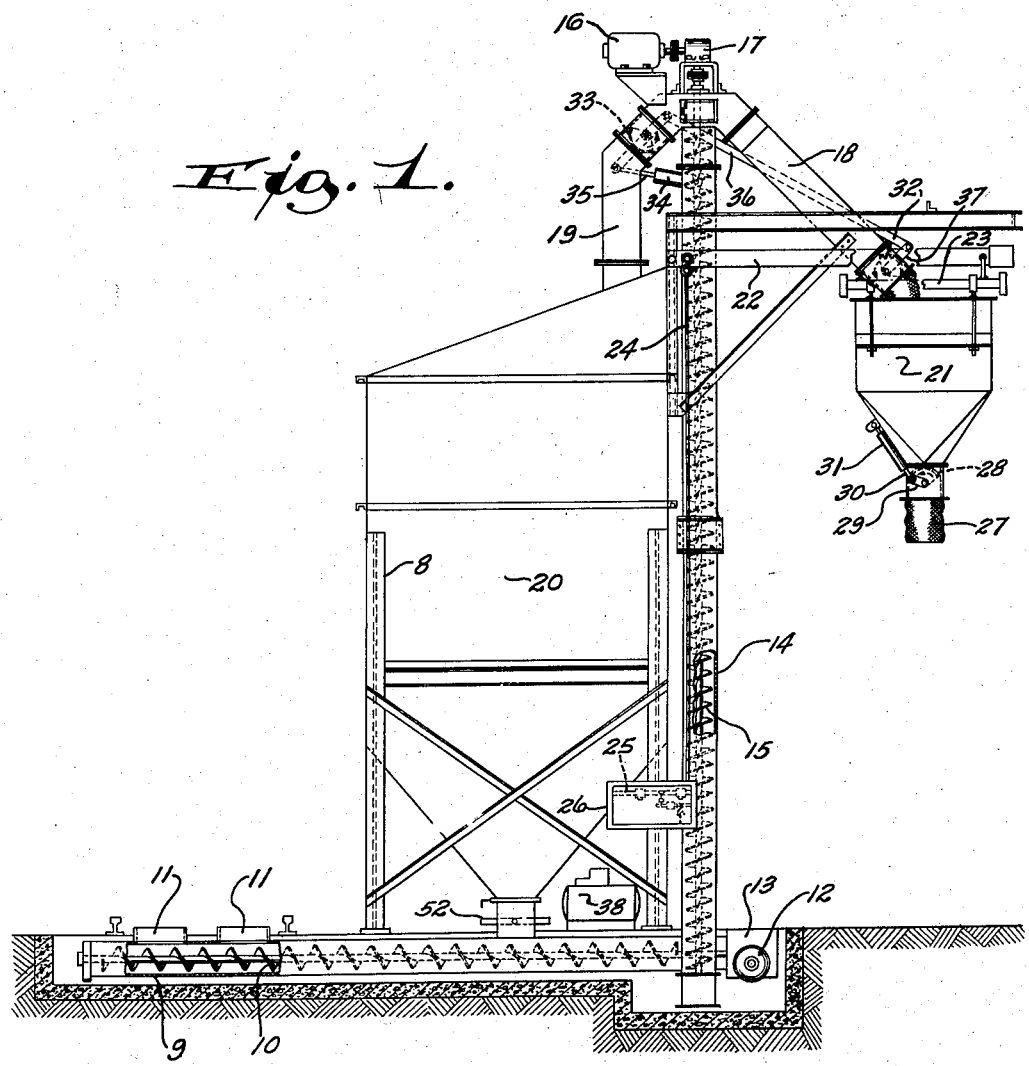
Fig. 1 is a side view of the improved automatic bulk material batch measuring and dispensing apparatus with parts broken away and in section to show structural details.

Referring now more particularly to Figs. 1 and 2 of the drawings it will appear that the major portion of the mechanism is supported by an open box-like vertically extending framework indicated generally by the numeral 8. This framework and the apparatus carried thereby is portable and may be quickly erected or set-up on the ground at any convenient station where the bulk material to be batched and delivered, is brought in by supply trucks or railroad cars. The function of the apparatus is to measure and dispense into trucks which are to proceed to the areas where the bulk material is to be used, measured quantities of the bulk material.

Below the ground level or driveway which is served by the incoming supply trucks or railroad cars there is an elongated horizontally disposed cylindrical housing 9 in which is disposed a driven horizontal conveyor screw 10. It is not essential, however, that the housing 9 and its screw 10 be disposed below the ground level, but the arrangement shown is one of convenience. The outer end of the horizontal housing 9 is formed on its upper side with a pair of hopper openings 11 which receive the bulk material from the supply trucks or cars propelled thereadjacent. The horizontal conveyor screw 10 is driven at a constant speed by a conventional electric motor 12 and a speed reducer 13 operatively connected with the inner end of the conveyor screw 10. Intersecting the inner end portion of the horizontal housing 9 is the lower end portion of a vertical conveyor housing 14 having therein an elongated vertical conveyor screw 15 driven at a constant rate of speed by an electric motor 16 and speed reducer 17 operatively associated with the upper end portion of the vertical conveyor screw 15. The housing 14 for the vertical screw 15 is suitably supported by one side portion of the framework 8. The lower end portion of the vertical housing 14 is in communication with the interior of the horizontal housing 9 so that bulk material introduced into the horizontal housing 9 through the hoppers 11 is conveyed by the horizontal screw toward the right, relative to Fig. 1, and is transferred to the lower end portion of the vertical housing 14 and is elevated therein by the driven vertical screw 15. Extending angularly outwardly and downwardly in opposite directions from the upper end portion of the vertical housing 14 and in communication therewith, is a batcher supply spout 18 and a return spout 19 which feeds into the upper end portion of a large capacity bin 20. The lower end portion of the batcher supply spout 18 is adapted to discharge into the upper end of a batcher 21. Scale arms 22 and 23 are movably horizontally disposed between upper side portions of the framework 8 and the batcher 21, the batcher 21 being suspended therefrom so that the weight of material delivered into the batcher through the batcher spout 18 will, when a predetermined load therein is reached, operate, through a cable or rod 24, a conventional scale beam mechanism 25 within a control box 26 mounted in an accessible position on a lower portion of the framework 8 for manipulation by an attendant or operator. The scale beam 25 may be pre-set so as to operate upon the attainment of a predetermined load within the batcher 21, whereupon certain valves or gates and other electrical elements will be automatically operated, as will be brought out hereinafter.

The lower end portion of the batcher 21 is reduced and tapered and carries a flexible discharge tube 27 which in practice may be brought into registration with the receptacle portion of a truck or the like driven below the batcher in order to receive and transport a measured batch of the bulk material. To control discharge from the reduced lower end of the batcher into the discharge tube 27 there is an oscillatory gate or valve 28 connected by arms 29 with the piston 30 of a conventional air cylinder 31. In Fig. 1 the batcher discharge control gate 28 is shown in its closed position but a projection of the piston 30 of the air cylinder 31 will move the gate 28 through an angle of about ninety degrees to open position, thereby permitting the free discharge of the material from the batcher 21 through the tube 27 to the receiving truck. In the lower end of the batcher supply spout 18 there is a similar movably mounted control gate 32 and in the upper end portion of the bin feeding spout 19 there is a similar movably mounted control gate 33. In Fig. 1, with the batcher gate 28 shown in closed position, the gate 33 is likewise in closed position while the gate 32 controlling the lower end of the batcher spout 18 is in open position. Both of the gates 32 and 33 are operated from a common air cylinder 34 whose piston 35 is connected by arms with the gate 33 and also by an elongated arm 36 to an operating link 37 for the gate 32. As is conventional, the air cylinders 31 and 34 are supplied with compressed air by suitable connections (not shown) and there is an air compressor 38 operated by an electric motor 39 (see Fig. 3).

With particular reference now to the wiring diagram shown in Fig. 3, it will be evident that circuit wires 40 extend to and are connected with a convenient source of electrical supply and the same connect by wires 41, 42 and 43 with the motor 16 for the vertical screw conveyor, the motor 12 for the horizontal screw conveyor and the motor 39 for the compressor 38. These elements are included in the power circuit which is also associated through a transformer 44, with a control circuit. Many of the elements of the control circuit are for convenience housed within or on the scale beam box 26. In the latter category is a starter switch 45 which when closed by the operator, through the circuit wires shown, starts the operation of the vertical screw conveyor motor 16 and horizontal screw conveyor motor 12. The operator also sets the poise in the scale beam box 26 for the desired weight or batch which is to be delivered to a truck stationed below the batcher 21 to receive material through the tube 27 when the batcher control gate 28 is open. The poise on the scale beam box must be set for the desired batch and then the batch control switch 46 (see Fig. 3) is manually operated. Through the electrical connections illustrated the batch solenoid 47 is then operated which, through the air cylinder 34, causes the gate 32 controlling discharge from the batcher supply spout 18 to open, and at the same time the gate 33 controlling the short circuiting of material to the bin supply spout 19 is closed. It will also be observed from Fig. 3 that there is a switch 48 which is operated by the scale beam 25 pursuant to the setting of the latter so that when the load of batch material received by the batcher 21 reaches the weight for which the scale beam 25 was set there will be automatic operation of the batch switch 48 which through its operation and electrical connections causes operation of the air cylinder 34 to close the batcher supply spout gate 32 and open the gate 33 in the bin supply spout 19. At this stage no more bulk material being brought up by the vertical conveyor 15 can enter the batcher 21 but will fill up the batcher supply spout 18 to provide a head of material and then short-circuit through the bin supply spout 19 into the bin or reservoir 20. To discharge or dispense a load from the batcher 21 it is necessary for the operator to manually operate a batcher discharge switch 49 on the scale beam box 26. Through the electrical connections this will lock out the weight beam mechanism as a safety factor and close a mercury switch 50 and also operate the air cylinder 31 for the batcher discharge gate 28 to cause said gate to move to open position whereby the accumulated batch of the desired predetermined weight within the batcher is delivered into the waiting truck or receptacle.

The motor 39 for the compressor 38 can be operated by a switch 51 which can either be manually operated or be set for automatic operation. The arrangement described is such that the batcher must be completely discharged before rebatching may be accomplished because the weight beam 25 cannot be reset until the switch 50 opens, which cannot be accomplished until a predetermined minimum weight within the batcher 21 is reached. It is also obvious that after the discharge of a load from the batcher the weigh beam may be reset.

As long as bulk material is being delivered to the horizontal conveyor 10 from the source through the hoppers 11 the material will be delivered along the horizontal conveyor 10 and up the vertical conveyor 15 even though the batcher is filled and the gate 32 in the batcher supply spout 18 is closed. In this event, as was previously explained, the gate 33 will be opened and the accumulating bulk material will be deposited into the bin or reservoir 20. Discharge from the lower end portion of the reservoir is controlled by a manually operated gate or valve 52. Normally this gate 52 may be kept closed, but should there be a lag in the normal supply of bulk material to the horizontal conveyor 10 due to the absence of supply trucks then, if continuous batching is desired, the gate 52 at the lower end of the bin 20 may be opened to permit discharge of the stored material in the bin into the horizontal conveyor for recirculation. Should the bin or reservoir 20 become completely filled with bulk material there is a pressure-operated electrically connected signal 53, either of a visual or audible type, which will notify the operator to stop the supply of bulk material from the source into the hoppers 11.

From the foregoing description it will be evident that the improved automatic batch measuring and dispensing apparatus is for the most part automatic in its operation and is foolproof in that the batcher may only be discharged when it is completely filled. When it is not in condition to receive any more material from the source, such material is diverted into the bin or reservoir 20 for recirculation when required. The apparatus is relatively inexpensive, is portable, expeditious in its operation, and is well adapted for the purposes described.

What is claimed as the invention is:

1. In combination, a first conveyor to receive bulk material from a source and advance it laterally, a vertical conveyor into the lower end portion of which said first conveyor feeds, an elevated batcher, a valve controlled discharge tube depending from the batcher, an adjustable scale mechanism operatively associated with the batcher to operate upon the receipt of a predetermined load of bulk material by the batcher, a bin having a gate controlled discharge end communicating with said first conveyor, a normally open valve controlled conduit extending from the upper end portion of the vertical conveyor to the batcher, and a normally closed valve controlled conduit extending from the upper end portion of the vertical conveyor to the bin, and means controlled by the scale mechanism upon the attainment of a predetermined load within the batcher for jointly and simultaneously closing the valve in the conduit to the batcher and opening the valve in the conduit to the bin.

2. In combination, a driven lateral conveyor to receive bulk material from a source and advance it laterally, a driven vertical conveyor into the lower end portion of which said lateral conveyor feeds, an elevated batcher, a valve controlled discharge tube depending from the batcher to dispense a predetermined batch of bulk material into a conveyance, scale mechanism operatively associated with the batcher, a bin having a gate controlled discharge end communicating with said lateral conveyor, a valve controlled batcher supply conduit interposed between the upper end portion of the vertical conveyor and the batcher, a valve controlled bin supply conduit interposed between the upper end portion of the vertical conveyor and the bin, electrically operated means controlled by a selected registration of said scale mechanism for jointly reversely operating the conduit valves, and other electrical means for operating the batcher discharge tube valve.

3. In combination, a first conveyor to receive bulk material from a source and advance it laterally, a vertical conveyor into the lower end portion of which said first conveyor feeds, motor means for operating said conveyors, an elevated batcher, a valve controlled discharge tube depending from the batcher, an adjustable scale mechanism operatively associated with the batcher to operate upon the receipt of a predetermined load of bulk material by the batcher, a bin having a gate controlled discharge end communicating with said first conveyor, a normally open valve controlled conduit extending from the upper end portion of the vertical conveyor to the batcher, a normally closed valve controlled conduit extending from the upper end portion of the vertical conveyor to the bin, electrical means controlled by the scale mechanism upon the attainment of a predetermined load within the batcher for simultaneously reversing the valves in the conduit to the batcher and in the conduit to the bin, and an electrical circuit including the scale mechanism and said electrical means.

4. In combination, a motor driven lateral conveyor to receive bulk material from a source and advance it laterally, a motor driven vertical conveyor into the lower end portion of which said lateral conveyor feeds, an elevated batcher, a valve controlled discharge tube depending from the batcher to dispense a predetermined batch of bulk material into a conveyance, adjustable scale mechanism operatively associated with the batcher and influenced by the weight of the load therein, a bin having a gate controlled discharge end communicating with said lateral conveyor to return bulk material thereto for re-circulation, a valve controlled batcher supply conduit interposed between the upper end portion of the vertical conveyor and the batcher, a valve controlled bin supply conduit interposed between the upper end poriton of the vertical conveyor and the bin, electrically operated means controlled by a selected registration of said scale mechanism for jointly reversely operating the conduit valves, and other means for operating the batcher discharge tube valve and the gate controlled discharge of the bin.

5. In combination, a motor driven lateral screw conveyor to receive bulk material from a source and advance it laterally, a motor driven vertical screw conveyor into the lower end portion of which said lateral conveyor feeds, said conveyors operating simultaneously, an elevated batcher, a valve controlled discharge tube depending from the batcher to dispense a predetermined batch of bulk material into a conveyance, adjustable scale mechanism associated with the batcher and operated by the weight of a predetermined load therein, a bin having a gate controlled discharge end communicating with said lateral conveyor to return bulk material thereto for re-circulation, a valve controlled batcher supply conduit interposed between the upper end portion of the vertical conveyor and the batcher, a valve controlled bin supply conduit interposed between the upper end portion of the vertical conveyor and the bin, electrically operated means controlled by a selected registration of said scale mechanism for simultaneously reversely operating the conduit valves, other means for operating the batcher discharge tube valve and the gate controlled discharge of the bin, and means to prevent opening of the batcher supply conduit valve until the batcher has completely discharged its load.

6. In combination, a driven lateral conveyor to receive bulk material from a source and advance it laterally, a driven vertical conveyor into the lower end portion of which said lateral conveyor feeds, an elevated batcher, a discharge tube depending from the batcher to dispense a predetermined batch of bulk material into a conveyance, a valve controlling said discharge tube, solenoid controlled piston means connected with said tube valve for operating it, adjustable scale mechanism connected with the batcher to register a load therein, a bin having a discharge end communicating with said lateral conveyor, a batcher supply conduit extending from the upper end portion of the vertical conveyor to the batcher, a valve controlling material flow through said batcher supply conduit, a bin supply conduit extending from the upper end portion of the vertical conveyor to the bin, a valve controlling material flow through said bin supply conduit, solenoid controlled piston means connected with both of said conduit valves for jointly reversely operating the same, a switch operated by the scale mechanism upon the registration of a selected batcher load, an electrical circuit including said switch and all of said solenoids, and means in said electric circuit to prevent operation of the scale operated switch and the discharge tube solenoid until the batcher has discharged its load.

References Cited in the file of this patent
UNITED STATES PATENTS

| | | |
|---|---|---|
| 297,027 | Smyser | Apr. 15, 1884 |
| 1,978,215 | McCrery | Oct. 23, 1934 |
| 2,048,877 | McCrery | July 28, 1936 |